(12) United States Patent
Nagashima et al.

(10) Patent No.: US 9,334,897 B2
(45) Date of Patent: May 10, 2016

(54) THRUST SLIDE BEARING, AND COMBINATION MECHANISM OF A THRUST SLIDE BEARING AND A PISTON ROD

(71) Applicant: OILES CORPORATION, Tokyo (JP)

(72) Inventors: Tsuyoshi Nagashima, Fujisawa (JP); Takashi Horiguchi, Fujisawa (JP)

(73) Assignee: OILES CORPORATION, Tokyo (JP)

( * ) Notice: Subject to any disclaimer, the term of this patent is extended or adjusted under 35 U.S.C. 154(b) by 0 days.

(21) Appl. No.: 14/374,880

(22) PCT Filed: Jan. 7, 2013

(86) PCT No.: PCT/JP2013/050041
§ 371 (c)(1),
(2) Date: Jul. 25, 2014

(87) PCT Pub. No.: WO2013/128949
PCT Pub. Date: Sep. 6, 2013

(65) Prior Publication Data
US 2015/0003761 A1    Jan. 1, 2015

(30) Foreign Application Priority Data
Feb. 28, 2012    (JP) ................. 2012-042329

(51) Int. Cl.
*F16C 17/04*    (2006.01)
*F16C 33/74*    (2006.01)
(Continued)

(52) U.S. Cl.
CPC ............... *F16C 17/04* (2013.01); *B60G 15/06* (2013.01); *B60G 15/067* (2013.01); *F16C 33/102* (2013.01); *F16C 33/20* (2013.01);
(Continued)

(58) Field of Classification Search
CPC ........ F16C 17/04; F16C 17/045; F16C 17/08; F16C 17/10; F16C 33/06; F16C 33/1065; F16C 33/20; F16C 33/201; F16C 33/74; F16C 2326/05; F16C 2361/53; B60G 15/06; B60G 15/067; B60G 15/068; B60G 2204/418
USPC ....................................................... 384/420
See application file for complete search history.

(56) References Cited

U.S. PATENT DOCUMENTS

| | | | |
|---|---|---|---|
| 8,256,965 B2 * | 9/2012 | Kaneko et al. | ................. 384/420 |
| 2010/0008610 A1 | 1/2010 | Kaneko et al. | |

(Continued)

FOREIGN PATENT DOCUMENTS

| | | |
|---|---|---|
| CN | 1688826 A | 10/2005 |
| EP | 2306043 A1 | 4/2011 |

(Continued)

*Primary Examiner* — James Pilkington
(74) *Attorney, Agent, or Firm* — patenttm.us

(57) ABSTRACT

The thrust slide bearing (1) has a synthetic resin bearing body (2) having a ring-shaped upper surface (5) that functions as a sliding surface, a ring-shaped metal plate (4) that is supported on the ring-shaped upper surface (5) to be freely rotatable relative to the bearing body (2), and a ring-shaped cover (3) disposed so as to cover the ring-shaped upper surface (5) and the ring-shaped metal plate (4). The ring-shaped metal plate (4) has an inner disc section (44) that is formed as a unit with an outer disc section (43) and is disposed in the through hole (25) of the ring-shaped cover (3). The inner disc section (44) also functions as a reinforcing part (rib) of the outer disc section (44). Thereby, the deformation of the thrust slide bearing (1) is prevented even when a large force is applied via the piston rod.

20 Claims, 6 Drawing Sheets

(51) Int. Cl.
  *B60G 15/06*   (2006.01)
  *F16C 33/10*   (2006.01)
  *F16C 33/20*   (2006.01)

(52) U.S. Cl.
  CPC .......... *F16C 33/74* (2013.01); *B60G 2204/418* (2013.01); *F16C 2326/05* (2013.01)

(56) References Cited

U.S. PATENT DOCUMENTS

2011/0135228 A1* 6/2011 Kaneko et al. ................ 384/420
2014/0185971 A1* 7/2014 Nagashima et al. .......... 384/291

FOREIGN PATENT DOCUMENTS

| | | |
|---|---|---|
| JP | 62-088817 A | 4/1987 |
| JP | 1-216116 A | 8/1989 |
| JP | 5-179277 A | 7/1993 |
| JP | 2000-192961 A | 7/2000 |
| JP | 2001-082457 A | 3/2001 |
| JP | 2004-176728 A | 6/2004 |
| JP | 2006-162019 A | 6/2006 |
| JP | 2007-308137 A | 11/2007 |
| JP | 2008-202703 A | 9/2008 |
| JP | 2011-196406 A | 10/2011 |
| WO | 2011/114619 A1 | 9/2011 |

* cited by examiner

Fig.1
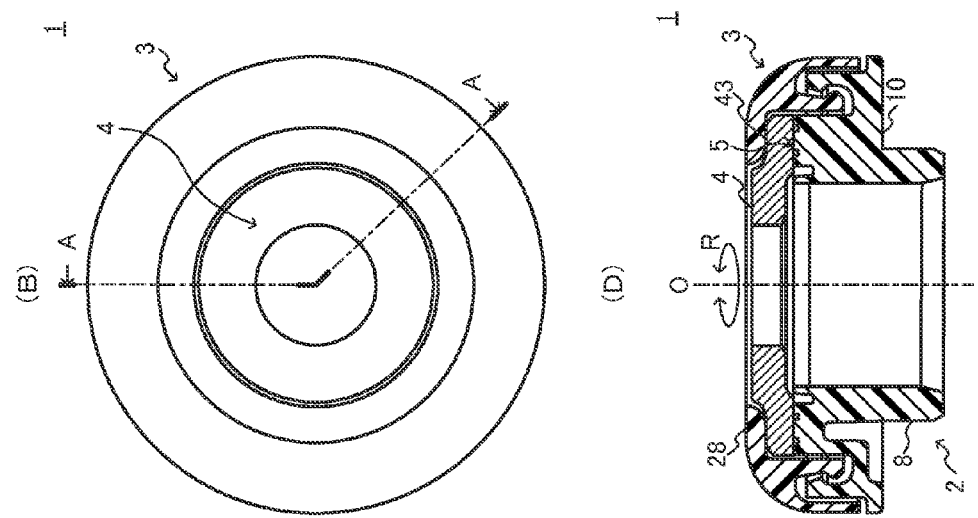
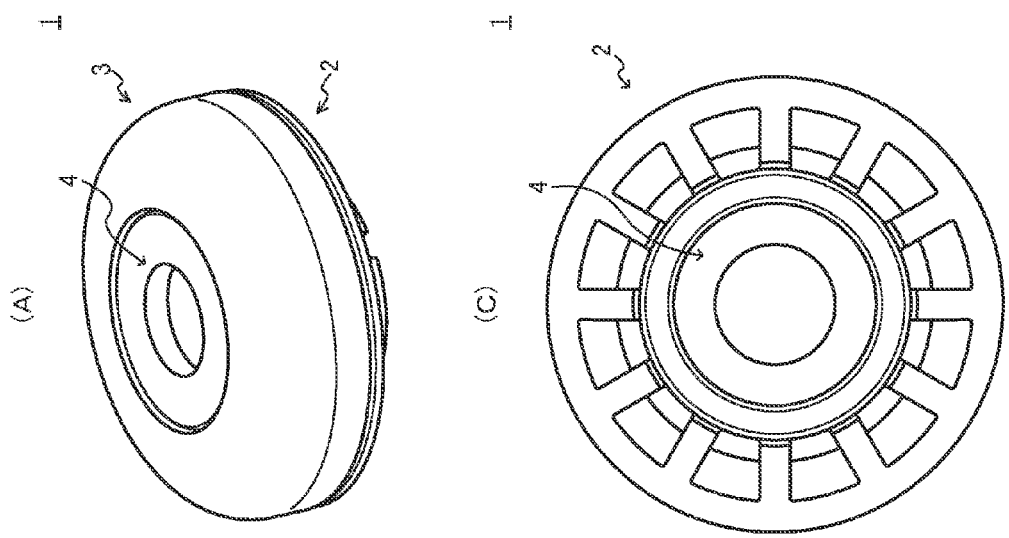

THRUST SLIDE BEARING, AND COMBINATION MECHANISM OF A THRUST SLIDE BEARING AND A PISTON ROD

TECHNICAL FIELD

The present invention relates to a thrust slide bearing, and particularly to a thrust slide bearing that is suitable for being incorporated as a slide bearing for a strut-type suspension (McPherson type) in a four-wheeled vehicle, and to a combination mechanism of the thrust slide bearing and a piston rod.

BACKGROUND ART

Generally, a strut-type suspension used for front wheels of a four-wheeled vehicle has structure wherein a strut assembly and a coil spring are combined, the strut assembly comprises an external cylinder that is integral with a main shaft, and a hydraulic shock absorber that is accommodated in the external cylinder. As such strut-type suspensions, there is a type in which a piston rod of the strut assembly rotates when the strut assembly rotates together with the coil spring in steering operation, and a type in which a piston rod does not rotate. In both types, sometimes a thrust slide bearing of synthetic resin, instead of a rolling bearing, is used between an installation mechanism for installing a strut assembly in a vehicle body and an upper spring washer member for a coil spring, so that the strut assembly rotates smoothly.

The installation mechanism for installing the strut assembly in the vehicle body uses an installation plate for supporting one end of the piston rod of the hydraulic shock absorber. However, in this type of installation mechanism, complex structure of the installation mechanism in addition to the need for the installation plate for supporting one end of the piston rod causes high cost.

To cope with the problems, Patent Literature 1 proposes a thrust slide bearing in an installation mechanism for installing a strut assembly in a vehicle body, wherein the thrust slide bearing, instead of an installation plate, supports one end of a piston rod, to simplify the structure of the installation mechanism and to reduce cost. Further Patent Literature 1 proposes a combination mechanism of the thrust slide bearing and a piston rod.

The thrust slide bearing described in Patent Literature 1 comprises: a ring-shaped first bearing body of synthetic resin, which has a ring-shaped upper surface and a ring-shaped engaging outer periphery; a ring-shaped second bearing body of synthetic resin, which is superimposed over the first bearing body so as to be relatively rotatable about the axis of the first bearing body, and has a ring-shaped lower surface being opposed to the ring-shaped upper surface of the first bearing body; a thrust slide bearing means, which is positioned between the ring-shaped upper surface of the first bearing body and the ring-shaped lower surface of the second bearing body and has at least one of a lower surface in slidable contact with the ring-shaped upper surface of the first bearing body, and an upper surface in slidable contact with the ring-shaped lower surface of the second bearing body; a ring-shaped top cover, which has a ring-shaped engaging inner periphery surface that engages with the ring-shaped engaging outer periphery surface of the first bearing body; and a ring-shaped metal plate, which is positioned between a ring-shaped upper surface of the second bearing body and a lower surface of the ring-shaped top cover such that a lower surface of the metal plate is in contact with the ring-shaped upper surface of the second bearing body and an upper surface of the metal plate is in contact with the lower surface of the ring-shaped top cover. In this thrust slide bearing, the ring-shaped metal plate has a ring-shaped inner periphery surface of a smaller diameter than the inner diameters of the ring-shaped inner periphery surfaces of both bearing bodies and the ring-shaped top cover, and this structure solves the above problems effectively.

CITATION LIST

Patent Literature

Patent Literature 1: Japanese Unexamined Patent Application Laid-Open No. 2008-202703

SUMMARY OF INVENTION

Technical Problem

In the thrust slide bearing described in Patent Literature 1, the flat ring-shaped metal plate is fixed by a nut to a threaded portion of a piston rod. Thus, when large force is applied to the ring-shaped metal plate via the piston rod, there is a possibility that the ring-shaped metal plate is deformed, and relative rotation of the piston rod makes abnormal noise.

Further, the thrust slide bearing described in Patent Literature 1 has many component parts, and this causes increase of weight. Further, the height of the slide bearing becomes higher, and thus also the height of the installation mechanism for supporting one end of the piston rod becomes higher, thus requiring a wider installation space.

The present invention has been made considering the above problems. An object of the invention is to provide a low and light thrust slide bearing and a combination mechanism of the thrust slide bearing and a piston rod, wherein the thrust slide bearing can prevent deformation of a ring-shaped metal plate to reduce generation of abnormal noise, even if large force is applied to the ring-shaped metal plate via a piston rod, prevent intrusion of foreign substances from outside into sliding surfaces, and reduce the number of component parts.

Solution to Problem

To solve the above problems, the present invention provides a thrust slide bearing, comprising:
a bearing body, which is formed by resin, and has a ring-shaped upper surface functioning as a sliding surface (thrust slide bearing surface);
a ring-shaped metal plate which is supported on the ring-shaped upper surface rotatably relative to the bearing body; and
a ring-shaped cover which is placed to cover the ring-shaped upper surface and the ring-shaped metal plate, wherein,
the bearing body comprises:
a cylindrical portion which has an cylindrical inner periphery surface defining a through-hole;
a ring-shaped flange portion which integrally extends outward in a radial direction from a cylindrical outer periphery surface of the cylindrical portion, to form the ring-shaped upper surface;
a ring-shaped protruding portion which integrally protrudes outward in a radial direction from a lower end side of a cylindrical outer periphery surface of the ring-shaped flange portion;
a cylindrical protruding portion which is integrally formed in a cylindrical shape with an upper surface of the ring-shaped protruding portion, and has a cylindrical inner periphery surface that defines a ring-shaped upward-open recessed portion that is opened upward, with a cylindrical outer periphery surface of the ring-shaped flange portion and an upper surface of the ring-shaped protruding portion;

a ring-shaped engaging protruding portion which integrally protrudes inward in the radial direction from an upper end side of the cylindrical outer periphery surface of the cylindrical protruding portion, and is connected to an upper surface of the cylindrical protruding portion; and a ring-shaped convex portion which integrally protrudes outward in the radial direction from an outer circumferential edge of the ring-shaped protruding portion, the ring-shaped cover comprises:

a ring-shaped disk portion which has an inner periphery surface defining a through-hole concentric with the through-hole of the bearing body and a lower surface connected to a lower edge of the inner periphery;

an inner cylindrical drooping portion which is integrally formed to have a cylindrical shape with an outer periphery surface of the disk portion;

a ring-shaped engaging protruding portion which protrudes outward in a radial direction from a lower end side of a cylindrical outer periphery surface of the inner cylindrical drooping portion, and engages with the engaging protruding portion of the bearing body;

a ring-shaped convex portion which protrudes outward in the radial direction from an upper end side of the cylindrical outer periphery surface of the inner cylindrical drooping portion; and an outer cylindrical drooping portion which is integrally formed to have a cylindrical shape with a lower surface of the ring-shaped convex portion, extends below a lower end of the inner cylindrical drooping portion, and defines a ring-shaped downward-open recessed portion that is downward opened, with the cylindrical outer periphery surface of the inner cylindrical drooping portion and the lower surface of the ring-shaped convex portion, the ring-shaped metal plate comprises:

a ring-shaped outer disk portion which comes in contact with the lower surface of the disk portion of the ring-shaped cover; and an inner disk portion which is integrally formed with the outer disk portion on an inner side of the outer disk portion in a radial direction, and is positioned in the through-hole defined by the inner periphery surface of the disk portion of the ring-shaped cover, the inner disk portion of the ring-shaped metal plate comprises:

a cylindrical inner surface which defines a through-hole concentric with the through-hole of the bearing body, and has a smaller diameter than a diameter of the inner periphery surface of the cylindrical portion of the bearing body, the ring-shaped upper surface of the bearing body comprises:

a ring-shaped deep groove which is formed in an inner circumferential side of the ring-shaped upper surface; and at least two recessed portions which are arranged along a circumferential direction to surround the ring-shaped deep groove, and have a depth shallower than a depth of the ring-shaped deep groove, and the ring-shaped deep groove and the at least two recessed portions are filled with a lubricant oil agent.

According to the thrust slide bearing of the present invention, the ring-shaped metal plate has the inner disk portion, which is formed integrally with the outer disk portion, to be positioned in the through-hole defined by the inner periphery surface of the disk portion of the ring-shaped cover. Accordingly, the inner disk portion serves a function similar to a reinforcing portion (rib) for the outer disk portion, and as a result, deformation of the ring-shaped metal plate can be prevented even if large force is applied to the ring-shaped metal plate via a piston rod. Thereby, generation of abnormal noise due to deformation of the ring-shaped metal plate can be suppressed as far as possible, in relative rotation of the piston rod.

Further, in the thrust slide bearing of the present invention, the ring-shaped deep groove which is formed in the inner circumferential side of the ring-shaped upper surface, and the at least two recessed portions which are arranged along the circumferential direction to surround the ring-shaped deep groove and have the depth shallower than the depth of the ring-shaped deep groove, are provided on the ring-shaped upper surface functioning as the sliding surface of the bearing body. These ring-shaped deep groove and the recessed portions are filled with the lubricant oil agent. As a result, the ring-shaped metal plate is directly supported on the ring shaped upper surface rotatably relative to the bearing body in the circumferential direction about the axis of the bearing body. Accordingly, the height of the thrust slide bearing itself can be lowered, the installation space of the thrust slide bearing can be reduced, and the number of the component parts can be reduced, to realize weight reduction and cost reduction of the thrust slide bearing as a whole.

Further, in the thrust slide bearing of the present invention, a first intrusion prevention means for preventing intrusion of foreign substances such as grit and dust from the outer periphery surface side of the thrust slide bearing onto the ring-shaped upper surface functioning as the sliding surface of the bearing body is formed by the outer periphery surface of the cylindrical protruding portion of the bearing body, the outer cylindrical drooping port on of the ring-shaped cover which surrounds the outer periphery surface, and the ring-shaped convex portion which integrally protrudes outward in the radial direction from the outer circumferential edge of the ring-shaped protruding portion of the bearing body so as to close the ring-shaped gap formed in the radial direction between the outer periphery surface and the outer cylindrical drooping portion. Further, a second intrusion prevention means for preventing intrusion of foreign substances such as grit and dust from the outer periphery surface side of the thrust slide bearing onto the ring-shaped upper surface functioning as the sliding surface of the bearing body is formed by the upward-open recessed portion of the ring-shaped protruding portion of the bearing body and the outer cylindrical drooping portion which is inserted into the upward-open recessed portion so that the engaging protruding portion of the ring-shaped cover is elastically fitted to the engaging protruding portion of the bearing body. Therefore, intrusion of foreign substances such as grit and dust onto the sliding surface of the thrust slide bearing can be prevented as far as possible, and rotation of the ring-shaped metal plate about the axis of the bearing body relative to the bearing body can be performed smoothly.

In the thrust slide bearing of the present invention, it is favorable that the bearing body is formed of thermoplastic resin such as polyacetal resin, polyamide resin, polyester resin, or the like. Further, in a favorable example, the ring-shaped cover is formed of thermoplastic resin such as polyacetal resin, polyamide resin, polyester resin, or the like. Instead of this, however, the ring-shaped cover may be formed of reinforced thermoplastic synthetic resin, which is thermoplastic synthetic resin reinforced by inorganic reinforcing material such as glass fiber, glass power, glass beads, carbon fiber, and the like or organic reinforcing material such as aramid resin fiber. Further, in a favorable example, the ring-shaped metal plate is formed of steel plate of steel, stainless steel, or the like. Instead of this, however, the ring-shaped metal plate may be formed of non-ferrous metal such as copper alloy, titanium alloy, or the like. Favorably, such ring-shaped metal plate is formed by press forming of automotive workable hot-rolled high tensile steel sheet (SPFH: JISG3134) (hereinafter, shortly referred to as hot-rolled high tensile steel sheet (SPFH)).

Further, in the thrust slide bearing of the present invention, the at least two recessed portions provided in the ring-shaped upper surface of the bearing body may be an inner ring-shaped shallow groove and an outer ring-shaped shallow groove, which are arranged in two lines, namely, an inner line and an outer line, along the circumferential direction so as to surround doubly the ring-shaped deep groove that is formed in the inner circumferential side of the ring-shaped upper surface. Here, the inner and outer ring-shaped shallow grooves have the depth shallower than that of the ring-shaped deep groove. Or, the at least two recessed portions may be a plurality of inner recessed portions and a plurality of outer recessed portions, which are arranged in two lines, namely, an inner line and an outer line, along the circumferential direction so as to surround the ring-shaped deep groove formed in the inner circumferential side of the ring-shaped upper surface. These recessed portions have the depth shallower than that of the ring-shaped deep groove. Here, the inner recessed portions and the outer recessed portions may be arranged to have phase difference in the circumferential direction from each other.

Here, the area ratio of the opening spaces of the opening spaces of the inner ring-shaped shallow groove and the outer ring-shaped shallow groove, which are formed in the ring-shaped upper surface and arranged in the two lines, namely, the inner line and the outer line, or the opening spaces of the plurality of inner recessed portions and the plurality of outer recessed portions, which are arranged in the two lines, namely, the inner line and the outer line, to the ring-shaped upper surface of the bearing body is 20-50%, and favorably 30-40%.

In detail, to make the lubricant oil agent exert its low frictional properties successfully in the inner ring-shaped shallow groove and the outer ring-shaped shallow groove or the plurality of inner recessed portions and the plurality of outer recessed portions, which are filled with the lubricant agent such as grease, it is favorable that the area ratio of the opening spaces of the inner ring-shaped shallow groove and the outer ring-shaped shallow groove or the plurality of inner recessed portions and the plurality of outer recessed portions to the ring-shaped upper surface of the bearing body is at least 20%. If, however, the area ratio exceeds 50%, it result in deterioration of strength of the thrust slide bearing surface, and plastic deformation such as creep is likely to occur.

Further, in the thrust slide bearing of the present invention, electrodeposition coating may be applied to the ring-shaped lower surface of the outer disk portion of the ring-shaped metal plate. Further, in the ring-shaped metal plate, it is favorable that at least one of the upper surface or the lower surface of the inner disk portion is coated with malleable soft metal such as zinc, copper, tin, or the like.

In the thrust slide bearing of the present invention, at least one of the lubricant oil agent and the electrodeposition coating is positioned between the ring-shaped lower surface of the outer disk portion of the ring-shaped metal plate and the ring-shaped upper surface of the bearing body, and accordingly the ring-shaped upper surface of the bearing body is rotatable relative to the ring-shaped lower surface of the outer disk portion of the ring-shaped metal plate about the axis of the bearing body via at least one of the lubricant oil agent and the electrodeposition coating. As a result, in the thrust slide bearing, the ring-shaped metal plate can smoothly rotate relative to the bearing body in the circumferential direction about the axis of the bearing body.

Further, in the thrust slide bearing of the present invention, the ring-shaped metal plate may have an inclined connecting portion that lies between the outer disk portion and the inner disk portion and extends obliquely upward from the inner periphery surface side of the outer disk portion, so as to be connected to the inner disk portion.

Further, in a favorable example of the thrust slide bearing of the present invention, the ring-shaped cover has a convex spheroidal outer periphery surface extending from the upper surface of the ring-shaped disk portion through the outer periphery surface of the ring-shaped convex portion to the outer periphery surface of the outer cylindrical drooping portion. Further, the outer periphery surface of the outer disk portion of the ring-shaped metal plate in contact with the lower surface of the disk portion of the ring-shaped cover is slidably in contact with the inner periphery surface of the inner cylindrical drooping portion that is connected to the lower surface of the disk portion of the ring-shaped cover.

Further, the present invention provides a combination mechanism of a thrust slide bearing and a piston rod, for example, for use in a strut-type suspension in a four-wheeled vehicle, wherein, the combination mechanism comprises: the thrust slide bearing of one of the above-described modes; and a piston rod of a shock absorber, the piston rod comprises:

a large-diameter portion which is positioned in the through-hole defined by the inner periphery surface of the cylindrical portion of the bearing body;

a small-diameter portion which is formed integrally with the large-diameter portion so as to have a smaller diameter than a diameter of the large-diameter portion, and is positioned in the through-hole defined by the cylindrical inner surface of the inner disk portion of the ring-shaped metal plate; and a threaded portion which is threaded in the small-diameter portion, and the ring-shaped metal plate is held between a ring-shaped step surface, which is formed between the large-diameter portion and the small-diameter portion of the piston rod, and a seating surface of a nut screwed onto the threaded portion.

Here, at least in the inner disk portion of the ring-shaped metal plate, it is favorable that at least of the upper surface and the lower surface held between the ring-shaped step surface of the piston rod and the seating surface of the nut is coated with malleable soft metal such as zinc, copper, tin, and the like. Thereby, at least one set of surfaces, i.e. either a set of the ring-shaped step surface and the lower surface of the inner disk portion, or a set of the seating surface of the nut and the upper surface of the inner disk portion comes in almost whole surface contact with each other, and local contact can be avoided. Accordingly, stress from the piston rod under load in the axial direction can be distributed. As a result, it is possible to prevent generation of damage such as cracking in the inner disk portion.

Advantageous Effects of Invention

The present invention can provide a light-weight thrust slide bearing and a combination mechanism of the thrust slide bearing and a piston rod, wherein: even if large force is applied to the ring-shaped metal plate via the piston rod, deformation of the ring-shaped metal plate can be prevented; and generation of abnormal noise can be reduced in relative rotation of the piston rod; and in addition, intrusion of foreign substances such as grit and dust onto the ring-shaped upper surface functioning as the sliding surface of the bearing body can be prevented as far as possible; the number of the component parts can be reduced; and the height of the thrust slide bearing and the combination mechanism can be reduced.

BRIEF DESCRIPTION OF DRAWINGS

FIGS. 1(A), 1(B), and 1(C) are a perspective view, a top view, and a bottom view of a thrust slide bearing 1 according to one embodiment of the present invention, and FIG. 1(D) is an A-A cross-section view of the thrust slide bearing 1 shown in FIG. 1(B);

DESCRIPTION OF EMBODIMENTS

Figure 2:
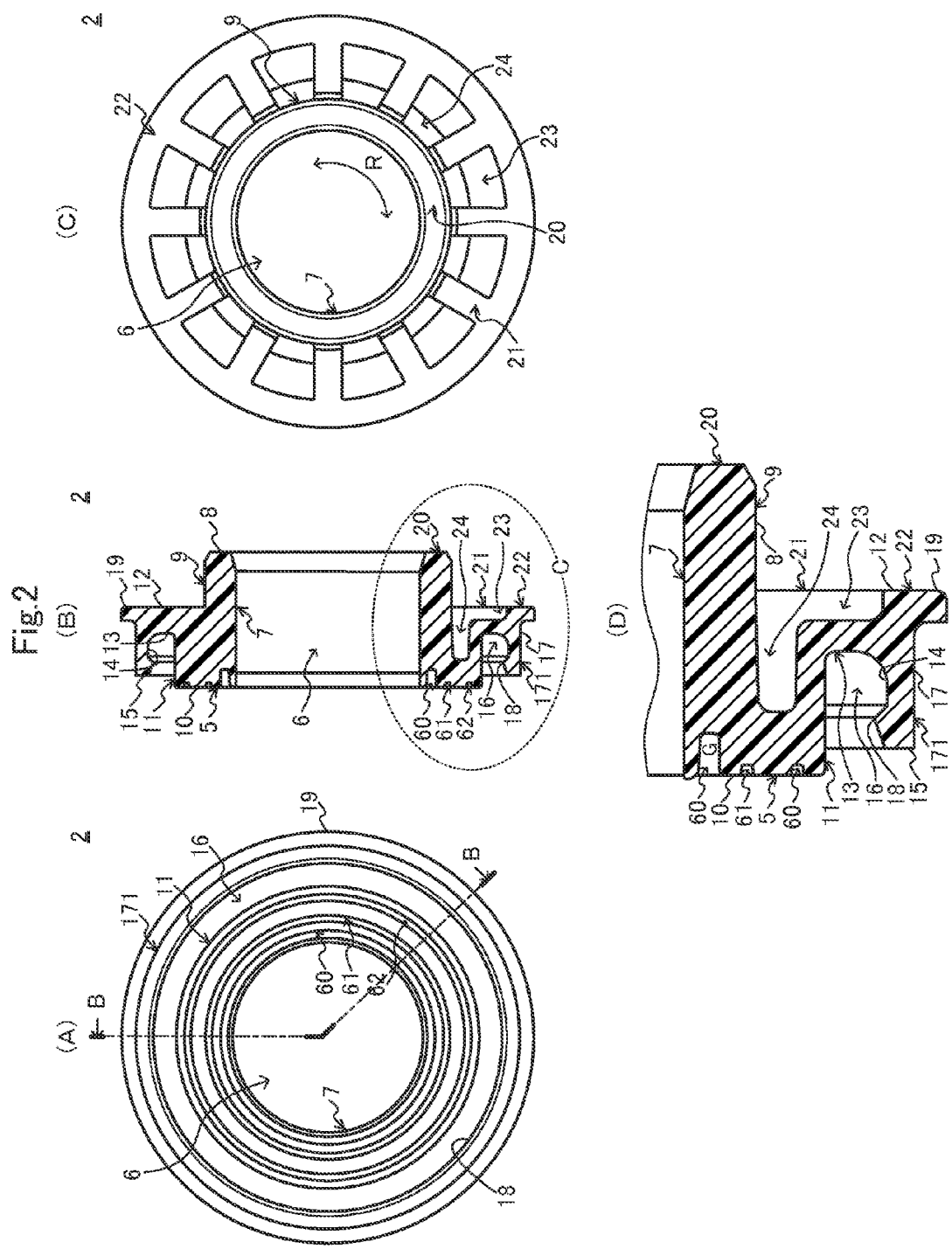
FIG. 2(A) is a top view of a bearing body 2.
FIG. 2(B) is a B-B cross-section view of the bearing body 2 shown in FIG. 2(A)
FIG. 2(C) is a bottom view of the bearing body 2.
FIG. 2(D) is an enlarged view of the part C of FIG. 2(B)

In the following, an embodiment of the present invention will be described referring to the drawings. The present invention is not limited to the embodiment described below, and can be changed variously within the scope of the invention.

FIGS. 1(A), 1(B), and 1(C) are a perspective view, a top view, and a bottom view showing a thrust slide bearing 1 of an embodiment of the present invention, and FIG. 1(D) is an A-A cross-section view of the thrust slide bearing 1 shown in FIG. 1(B).

As shown in the figures, the thrust slide bearing 1 of the present embodiment comprises: a bearing body 2 of synthetic resin which has a ring-shaped upper surface 5 functioning as a sliding surface (thrust slide bearing surface); a ring-shaped metal plate 4 which is placed on the ring-shaped upper surface 5 of the bearing body 2; and a ring-shaped cover 3 which is placed to cover the ring-shaped upper surface 5 of the bearing body 2 and the ring-shaped metal plate 4. The ring-shaped metal plate 4 is supported rotatably relative to the bearing body 2 in the circumferential direction R about the axis O of the bearing body 2.

The bearing body 2 is made of thermoplastic synthetic resin such as polyacetal resin, polyamide resin, polybutylene terephthalate resin, and the like.

FIG. 2(A) is a top view of the bearing body 2, FIG. 2(B) is a B-B cross-section view of the bearing body 2 shown in FIG. 2(A), FIG. 2(C) is a bottom view of the bearing body 2, and FIG. 2(D) is an enlarged view of the part C of FIG. 2(B).

As shown in the figures, the bearing body 2 comprises: a cylindrical portion 8 which has a cylindrical inner periphery surface 7 defining a through-hole 6; a ring-shaped flange portion 10 which integrally extends outward in the radial direction from a cylindrical outer periphery surface 9 of the cylindrical portion 8, and forms a ring-shaped upper surface 5 in combination with the cylindrical portion 8; a ring-shaped protruding portion 12 which integrally protrudes outward in the radial direction from the lower end side of a cylindrical outer periphery surface 11 of the ring-shaped flange portion 10; a cylindrical protruding portion 17 which is integrally formed in a cylindrical shape with a ring-shaped upper surface 13 of the ring-shaped protruding portion 12, and defines a ring-shaped upward-open recessed portion 16 opened upward in combination with the cylindrical outer periphery surface 11 of the ring-shaped flange portion 10 and the upper surface 13 of the ring-shaped protruding portion 12; a ring-shaped engaging protruding portion 18 which integrally protrudes inward in the radial direction from the upper end side of the cylindrical inner periphery surface 14 of the cylindrical protruding portion 17, and is connected to the ring-shaped upper surface 15 of the cylindrical protruding portion 17; and a ring-shaped convex portion 19 which integrally protrudes outward in the radial direction from the outer circumferential edge of the ring-shaped protruding portion 12.

The cylindrical portion 8 of the bearing body 2 has a ring-shaped lower surface 20 as well as the inner periphery surface 7 and the outer periphery surface 9. In a ring-shaped lower surface 21 of the ring-shaped flange portion 10 positioned above this lower surface 20 and in an lower surface 22 (which is flush with the lower surface 21) of the ring-shaped protruding portion 12, there are formed a plurality of recessed portions 23 arranged in the circumferential direction R separately from one another and a plurality of recessed portions 24 that are adjacent to the recessed portions 23 in the radial direction and deeper than the recessed portions 23.

The ring-shaped upper surface 5 of the bearing body 2 has a ring-shaped deep groove 60 which is formed in the inner circumferential side of the ring-shaped upper surface 5, and a plurality of recessed portions which surround multiply the ring-shaped deep groove 60. In the present embodiment, as the plurality of recessed portions that surround multiply the ring-shaped deep groove 60, there are formed an inner ring-shaped shallow groove 61 and an outer ring-shaped shallow groove 62 which have the same depth shallower than that of the ring-shaped deep groove 60 and are arranged in two lines, namely, an inner line and an outer line, along the circumferential direction R to surround the ring-shaped deep groove 60 doubly. The ring-shaped deep groove 60, the inner ring-shaped shallow groove 61, and the outer ring-shaped shallow groove 62 are filled with a lubricant oil agent G such as grease.

The ring-shaped cover 3 is formed of: thermoplastic synthetic resin such as polyacetal resin, polyamide resin, polybutylene terephthalate resin, and the like; or reinforced thermoplastic synthetic resin, namely, the above-mentioned thermoplastic synthetic resin which is reinforced by inorganic filler such as glass fiber, glass powder, glass beads, carbon fiber, and the like, or by organic filler such as aramid resin fiber.

Figure 3:
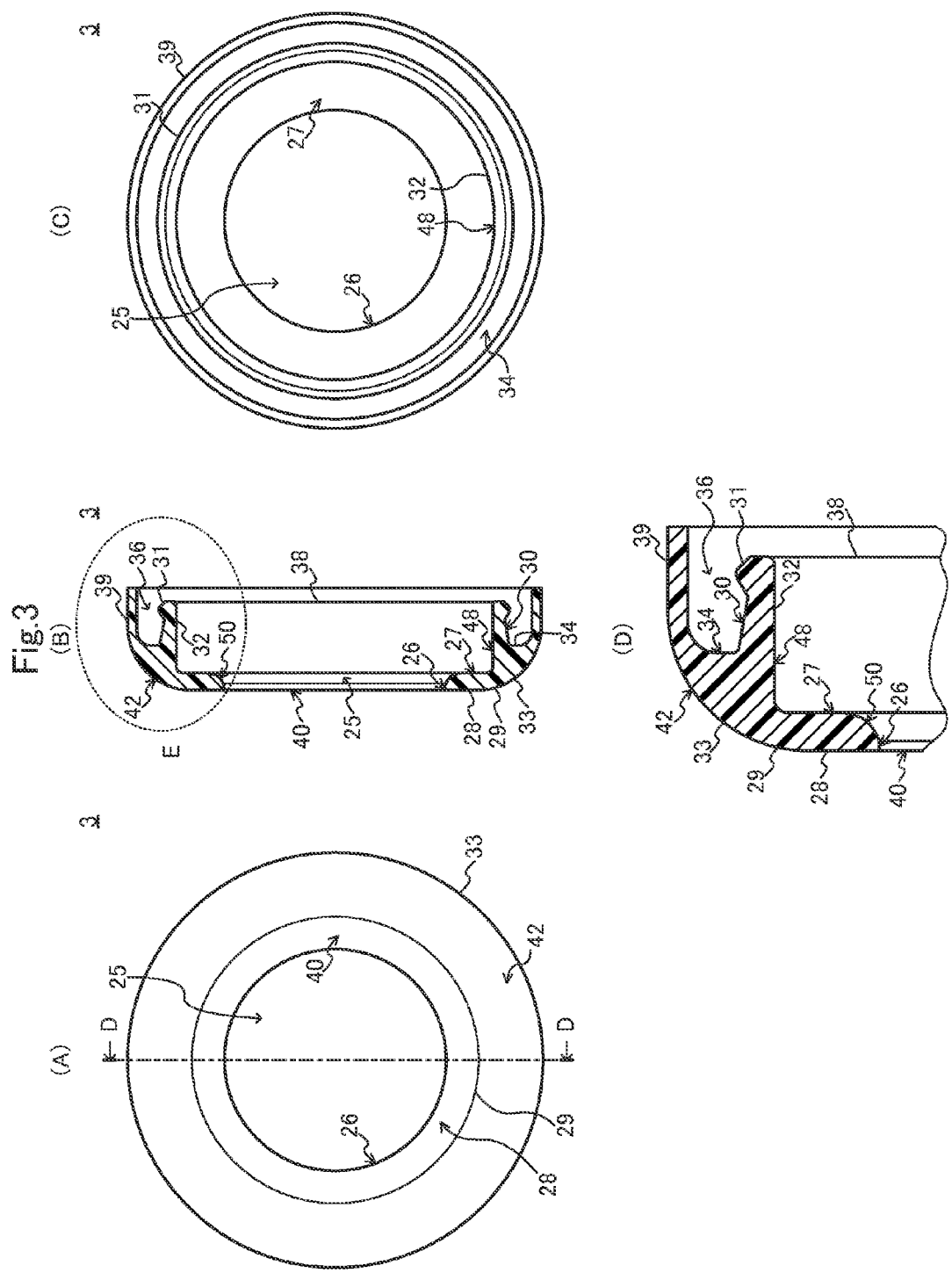
FIG. 3(A) is a top view of a ring-shaped cover 3.
FIG. 3(B) is a D-D cross-section view of the ring-shaped cover 3 shown in FIG. 3(A)
FIG. 3(C) is a bottom view of the ring-shaped cover 3.
FIG. 3(D) is an enlarged view of the part E of FIG. 3(B)

FIG. 3(A) is a top view of the ring-shaped cover 3, FIG. 3(B) is a D-D cross-section view of the ring-shaped cover 3 shown in FIG. 3(A), FIG. 3(C) is a bottom view of the ring-shaped cover 3, and FIG. 3(D) is an enlarged view of the part E of FIG. 3(B).

As shown in the figures, the ring-shaped cover 3 has: a ring-shaped disk portion 28 having an inner periphery surface 26 which defines a through-hole 25 concentric with the through-hole 6 of the bearing body 2, a truncated conical surface 50 which is connected to the lower edge of the inner periphery 26, and a lower surface 27 connected to a lower edge of the truncated conical surface 50; an inner cylindrical drooping portion 32 which is integrally formed to have a cylindrical shape with the outer circumferential edge 29 of the disk portion 28; a ring-shaped engaging protruding portion 31 which protrudes outward in the radial direction from the lower end side of the cylindrical outer periphery surface 30 of the inner cylindrical drooping portion 32, and engage s with the engaging protruding portion 18 of the bearing body 2; a ring-shaped convex portion 33 which protrudes outward in the radial direction from the upper end side of the cylindrical outer periphery surface 30 of the inner cylindrical drooping portion 32; and an outer cylindrical drooping portion 39 which is integrally formed to have a cylindrical shape with the lower surface 34 of the ring-shaped convex portion 33, extends below the lower end 38 of the inner cylindrical drooping portion 32, and defines a ring-shaped downward-open recessed portion 36 opened downward in combination with the cylindrical outer periphery 30 of the inner cylindrical drooping portion 32 and the lower surface 34 of the ring-shaped convex portion 33.

Further, the ring-shaped cover 3 has an upper surface 40 that spreads from the upper surface of the ring-shaped disk portion 28 through the outer periphery surface of the ring-shaped convex portion 33 and the outer periphery surface of the outer cylindrical drooping portion 39.

The ring-shaped metal plate 4 is formed of a steel plate of steel or stainless steel and the like, or non-ferrous metal such as copper alloy, titanium alloy, and the like. Favorably, the ring-shaped metal plate 4 is formed by press forming of hot-rolled high tensile steel sheet (SPFH).

Figure 4:
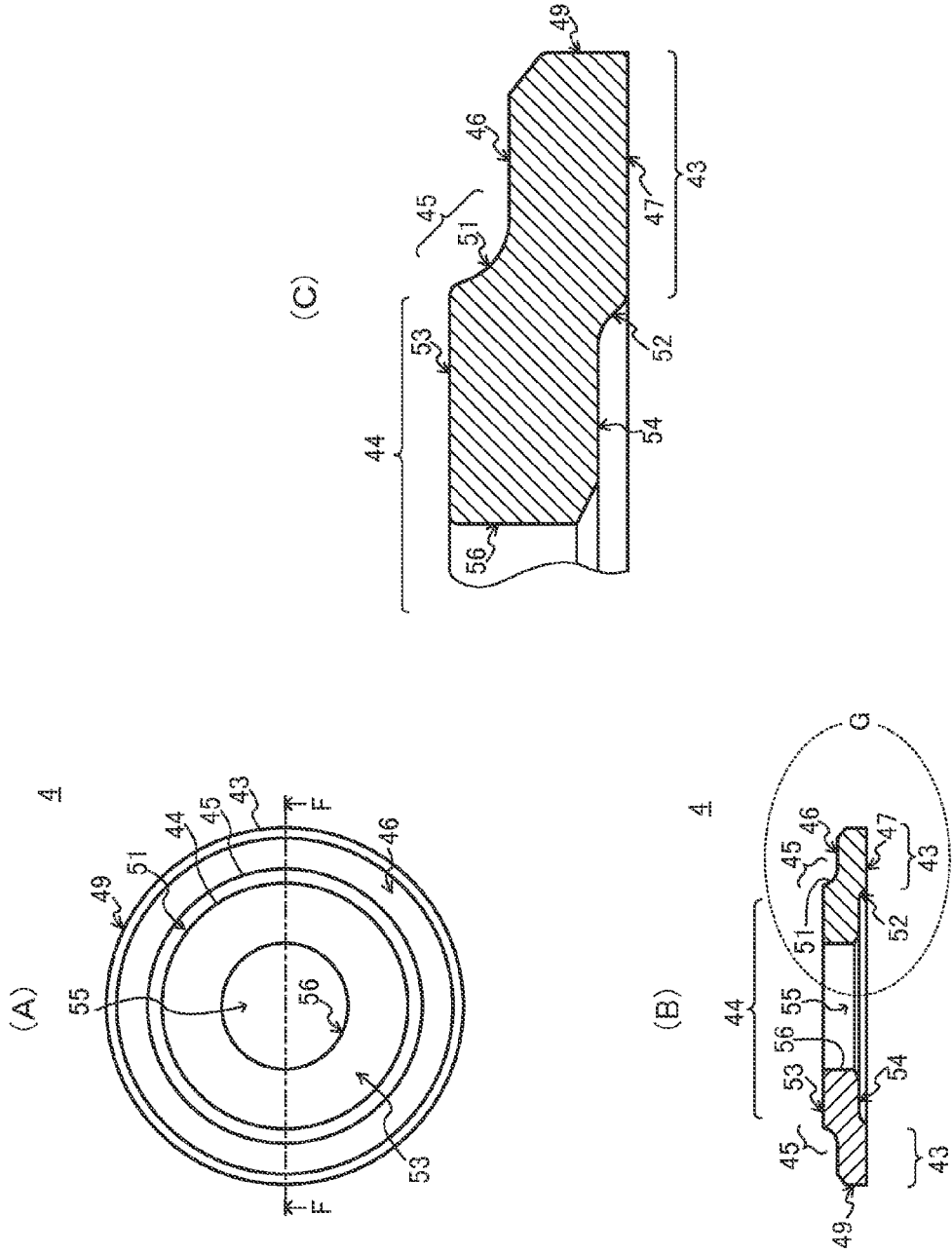
FIG. 4(A) is a top view showing a ring-shaped metal plate 4.
FIG. 4(B) is an F-F cross-section view of the ring-shaped metal plate 4 shown in FIG. 4(A)
FIG. 4(C) is an enlarged view of the part G of FIG. 4(B)

FIG. 4(A) is a top view of the ring-shaped metal plate 4, FIG. 4(B) is an F-F cross-section view of the ring-shaped metal plate 4 shown in FIG. 4(A), and FIG. 4(C) is an enlarged view of the part G of FIG. 4(B).

As shown in the figures, the ring-shaped metal plate 4 comprises: a ring-shaped outer disk portion 43 which comes in contact with the lower surface 27 of the disk portion 28 of the ring-shaped cover 3; and an inner disk portion 44 which is integrally formed with the outer disk portion 43 on the inner side in the radial direction, so as to be positioned in the through-hole 25 defined by the inner periphery surface 26 of the disk portion 28 of the ring-shaped cover 3. Further, in addition to the outer disk portion 43 and the inner disk portion 44, the ring-shaped metal plate 4 has an inclined connecting portion 45 which lies between the outer disk portion 43 and the inner disk portion 44 and extends obliquely upward from the inner periphery surface side of the outer disk portion 43, so as to be connected to the inner disk portion 44.

As shown in FIG. 1(D), in the axial direction O, the outer disk portion 43 of the ring-shaped metal plate 4 is disposed between the cylindrical portion 8 and the ring-shaped flange portion 10 of the bearing body 2 and the disk portion 28 of the ring-shaped cover 3. Further, the outer disk portion 43 comprises: a ring-shaped upper surface 46; a ring-shaped lower surface 47 which is opposed to the ring-shaped upper surface 5 functioning as the sliding surface of the bearing body 2; and a cylindrical outer periphery 49 which is opposed to the inner periphery 48 of the inner cylindrical drooping portion 32 of the ring-shaped cover 3.

The inclined connecting portion 45 of the ring-shaped metal plate 4 comprises: an inclined outer periphery surface 51 which is opposed to the truncated conical surface 50 of the ring-shaped cover 3 in the radial direction; and an inclined inner periphery surface 52 which extends approximately parallel to the inclined outer periphery surface 51.

The inner disk portion 44 of the ring-shaped metal plate 4 comprises: a ring-shaped upper surface 53 which is connected to the upper edge of the inclined outer periphery surface 51 and exposed upward from the through-hole 25 defined by the inner periphery surface 26 of the disk portion 28 of the ring-shaped cover 3; a ring-shaped lower surface 54 which extends almost in parallel with the upper surface 53; and a cylindrical inner surface 56 which defines a through-hole 55 that is concentric with the through-hole 6 of the bearing body 2 and the through-hole 25 of the ring-shaped cover 3, and has a smaller diameter than that of the inner periphery surface 7 of the cylindrical portion 8 of the bearing body 2.

As described above, it is favorable that the ring-shaped metal plate 4 is formed by press forming of hot-rolled high tensile steel sheet (SPFH). In that case, as described below referring to FIG. 5, it is favorable that at least one (sandwiched surface) of the ring-shaped upper surface 53 and the ring-shaped lower surface 54 of the inner disk portion 44 held between a ring-shaped step surface 76 and a seating surface (lower surface) 78 of a nut 77 is coated with malleable soft metal such as zinc, copper, tin, and the like. The ring-shaped step surface 76 is formed between a large-diameter portion 73 and a small-diameter portion 74 of the piston rod 63. By applying such metal plating, at least one set of surfaces, namely, either a set of the ring-shaped step surface 76 and the lower surface 54 of the inner disk portion 44 or a set of the seating surface 78 of the nut 77 and the upper surface 53 of the inner disk portion 44 comes in almost whole surface contact with each other, and local contact can be avoided. Accordingly, stress from the piston rod 63 under load in the axial direction can be distributed. As a result, it is possible to prevent generation of damage such as cracking in the inner disk portion 44 and the outer disk portion 43 formed integrally with the inner disk portion 44.

As described above, in the thrust slide bearing 1 of the above configuration, the ring-shaped upper surface 5 of the bearing body 2 comprises: the ring-shaped deep groove 60 formed in the inner circumferential side of the ring-shaped upper surface 5; and the inner ring-shaped shallow groove 61 and the outer ring-shaped shallow groove 62 which are arranged in two lines, namely, the inner line and the outer line, along the circumferential direction R so as to surround the ring-shaped deep groove 60 doubly, and have the same depth shallower than that of the ring-shaped deep groove 60. The ring-shaped deep groove 60, the inner ring-shaped shallow groove 61, and the outer ring-shaped shallow groove 62 are filled with the lubricant oil agent G such as grease. The lubricant oil agent G with which the ring-shaped deep groove 60, the inner ring-shaped shallow groove 61, and the outer ring-shaped shallow groove 62 are filled, is spread on the ring-shaped upper surface 5 so as to intervene between the ring-shaped upper surface 5 and the ring-shaped lower surface 47 of the ring-shaped metal plate 4 opposed to the ring-shaped upper surface 5. By this, the ring-shaped upper surface 5 of the bearing body 2 comes in smooth contact with the ring-shaped lower surface 47 of the ring-shaped metal plate 4 rotatably in the circumferential direction R about the axis O relative to the ring-shaped lower surface 47. Thus the ring-shaped upper surface 5 functions as the sliding surface (thrust slide bearing surface).

Here, the area ratio of the opening spaces of the inner ring-shaped shallow groove 61 and the outer ring-shaped shallow groove 62, to the ring-shaped upper surface 5 of the bearing body 2 is 20-50% and favorably 30-40%. The inner ring-shaped shallow groove 61 and the outer ring-shaped shallow groove 62 are formed in the ring-shaped upper surface 5 of the bearing body 2 and arranged in two lines, namely, the inner line and the outer line. In detail, to make the lubricant oil agent G exert its low frictional properties successfully in the inner ring-shaped shallow groove 61 and the outer ring-shaped shallow groove 62 filled with the lubricant oil agent G such as grease, it is favorable that the area ratio of the inner ring-shaped shallow groove 61 and the outer ring-shaped shallow groove 62 to the ring-shaped upper surface 5 of the bearing body 2 is at least 20%. If, however, the area ratio exceeds 50%, it results in deterioration of strength of the thrust slide bearing surface, and plastic deformation such as creep is likely to occur. The example shown in FIG. 2(A) is formed to have the ratio 30%.

In the thrust slide bearing 1 of the above configuration, the inner ring-shaped shallow groove 61 and the outer ring-shaped shallow groove 62 are formed in the ring-shaped upper surface 5 of the bearing body 2 which functions as the sliding surface (thrust slide bearing surface). And therefore, the contact area between the ring-shaped upper surface 5 of the bearing body 2 and the ring-shaped lower surface 47 of the outer disk portion 43 of the ring-shaped metal plate 4 is reduced in relative rotation between the ring-shaped upper surface 5 of the bearing body 2 and the counterpart member, namely, the ring-shaped lower surface 47 of the outer disk portion 43 of the ring-shaped metal plate 4 in the circumferential direction R about the axis O. So, the contact pressure (load per unit of area) applied on the ring-shaped upper surface 5 of the bearing body 2 can be raised. This, coupled with the reduced friction due to spreading of the lubricant oil agent G (with which the inner ring-shaped shallow groove 61 and the outer ring-shaped shallow groove 62 are filled) on the ring-shaped upper surface 5, can realize further reduction of friction.

According to the thrust slide bearing 1 of the present embodiment, the engaging protruding portion 31 of the ring-shaped cover 3 is elastically fitted (snap-fit) to the engaging protruding portion 18 of the bearing body 2 owing to the flexibility of the synthetic resin. By this, the bearing body 2 and the ring-shaped cover 3 are connected with each other by being superposed via the ring-shaped metal plate 4. In rotation of the bearing body 2 relative to the ring-shaped metal plate 4 in the circumferential direction R about the axis O, there arises sliding in the circumferential direction R between the ring-shaped upper surface 5 of the bearing body 2 and the ring-shaped lower surface 47 of the ring-shaped outer disk portion 43 of the ring-shaped metal plate 4, the ring-shaped lower surface 47 opposed to the ring-shaped upper surface 5 via the lubricant G. Thus, relative rotation in the circumferential direction R between the bearing body 2 and the ring-shaped metal plate 4 can be realized under lower friction torque.

Further, in the thrust slide bearing 1 of the present embodiment, a first intrusion prevention means for preventing intrusion of foreign substances such as grit and dust from the outer periphery surface side of the thrust slide bearing 1 onto the ring-shaped upper surface 5 of the bearing body 2 is formed by the outer periphery surface 171 of the cylindrical protruding portion 17 of the bearing body 2, the outer cylindrical drooping portion 39 of the ring-shaped cover 3 which surrounds the outer periphery surface 171, and the ring-shaped convex portion 19 which integrally protrudes outward in the radial direction from the outer circumferential edge of the ring-shaped protruding portion 12 of the bearing body 2 so as to close the ring-shaped gap formed in the radial direction between the outer periphery surface 171 and the outer cylindrical drooping portion 39. Further, a second intrusion prevention means for preventing intrusion of foreign substances such as grit and dust from the outer periphery surface side of the thrust slide bearing 1 onto the ring-shaped upper surface 5 of the bearing body 2 is formed by the upward-open recessed portion 16 of the ring-shaped protruding portion 12 of the bearing body 2 and the outer cylindrical drooping portion 39 which is inserted into the upward-open recessed portion 16 so that the engaging protruding portion 31 of the ring-shaped cover 3 is elastically fitted to the engaging protruding portion 18 of the bearing body 2. Therefore, intrusion of foreign substances such as grit and dust onto the ring-shaped upper surface 5 functioning as the sliding surface of the bearing body 2 can be prevented as far as possible, and rotation of the ring-shaped metal plate 4 about the axis O relative to the bearing body 2 can be performed smoothly.

Next, a combination mechanism of the thrust slide bearing 1 of the present embodiment and a piston rod will be described.

Figure 5:
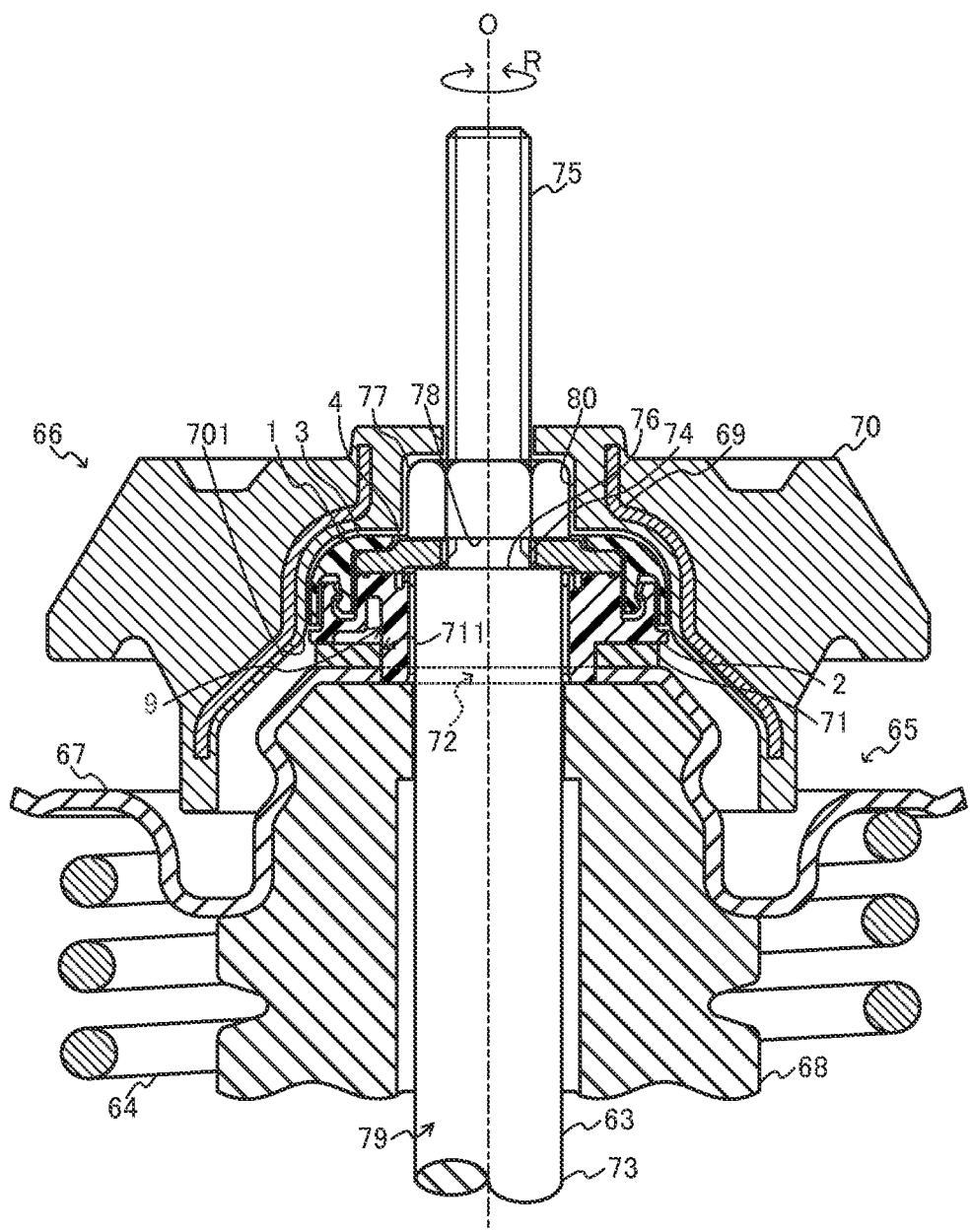
FIG. 5 is a cross-section view for explaining an example where the thrust slide bearing 1 of one embodiment of the present invention is used in a strut-type suspension.

FIG. 5 is a cross-section view for explaining an example where the thrust slide bearing 1 of one embodiment of the present invention is used in a strut-type suspension.

As shown in the figure, the thrust slide bearing 1 of the present embodiment is mounted in a strut-type suspension 65 of a vehicle, such as a four-wheeled vehicle. The strut-type suspension 65 comprise a hydraulic shock absorber (not shown) having a piston rod 63, and a coil spring 64 placed to surround the shock absorber. The strut-type suspension 65 mounted with the thrust slide bearing 1 is attached in a vehicle body (not shown) via an installation mechanism 66.

The strut-type suspension 65 comprises: the hydraulic shock absorber; the coil spring 64; and further, an upper spring seat member 67 for receiving one end of the coil spring 64; and a bump stopper 68 placed to surround the piston rod 63.

The installation mechanism 66 comprises: an elastic member 70 such as rubber in which a core metal 69 is embedded; and a spacer member 71, which is placed between the upper spring seat member 67 of the strut-type suspension 65 and the lower surface 21 of the ring-shaped flange portion 10 of the bearing body 2 and the lower surface 22 of the cylindrical protruding portion 17 of the bearing body 2.

The thrust slide bearing 1 is placed between the elastic member 70 of the installation mechanism 66 and the upper spring seat member 67 of the strut-type suspension 65 via the spacer member 71. Further, the thrust slide bearing 1 is positioned by the upper spring seat member 67 with respect to the orthogonal direction to the axis O, namely, the radial direction, when the lower end portion of the cylindrical portion 8 of the bearing body 2 is inserted into a through-hole 72 formed in the center of the upper spring seat member 67.

The inner periphery 711 of the spacer member 71 is in contact with the outer periphery 9 of the cylindrical portion 8 of the bearing body 2.

The elastic member 70 surrounding the thrust slide bearing 1 is positioned to be in contact with a convex spheroidal outer periphery surface 42 of the ring-shaped cover 3 at the inner periphery surface 701 of the elastic member 70.

The piston rod 63 comprises: the large-diameter portion 73 positioned to pass through the through-hole 6 of the bearing body 2; the small-diameter portion 74 which is integrally formed with the large-diameter portion 73 and is positioned to pass through the through-hole 55 of the ring-shaped metal plate 4; and a threaded portion 75 threaded in the small-diameter portion 74.

At the outer periphery surface 79 of the large-diameter portion 73 of the piston rod 63, the large-diameter portion 73 is in contact with the inner periphery surface 7 of the cylindrical portion 8 defining the through-hole 6 of the bearing body 2 of the thrust slide bearing 1, rotatably in the circumferential direction R.

Onto the threaded portion 75 of the piston rod 63, the nut 77 is screwed. The nut 77 is in contact with the ring-shaped inner periphery surface 80 of the elastic member 70 at the outer periphery surface of the nut 77, so that the nut 77 screwed onto the threaded portion 75 is fixed to the piston rod 63, not to rotate in the circumferential direction R relative to the elastic member 70.

At the inner disk portion 44, the ring-shaped metal plate 4 is held between the ring-shaped step surface 76 which is formed between the large-diameter portion 73 and the small-diameter portion 74 of the piston rod 63, and the seating surface 78 of the nut 77 screwed onto the threaded portion 75.

The ring-shaped cover 3 is held by the elastic member 70, not to rotate in the circumferential direction R relative to the piston rod 63, via the ring-shaped metal plate 4 held at the inner disk portion 44 between the ring-shaped step surface 76 of the piston rod 63 and the seating surface 78 of the nut 77.

In the above-described combination mechanism of the thrust slide bearing 1 and the piston rod 63, when the coil spring 64 rotates in the circumferential direction R about the axis O by steering operation, the bearing body 2 rotates in the circumferential direction R relative to the ring-shaped metal plate 4, similarly to the coil spring 64. This rotation of the bearing body 2 is done smoothly because the lubricant oil agent G such as grease, with which the ring-shaped deep groove 60, the inner ring-shaped shallow groove 61, and the outer ring-shaped shallow groove 62 of the bearing body 2 are filled, is spread on the ring-shaped upper surface 5 functioning as the sliding surface, and the ring-shaped upper surface 5 and the ring-shaped lower surface 47, which is opposed to the ring-shaped upper surface 5, of the outer disk portion 43 of the ring-shaped metal plate 4, are slidably in contact with each other in the circumferential direction in the state that the lubricant oil agent G interposes. Accordingly, also the steering operation is performed without resistance.

In the thrust slide bearing 1 of the present embodiment, the ring-shaped metal plate 4 is supported rotatably in the circumferential direction R relative to the bearing body 2 by the ring-shaped upper surface 5 functioning as the sliding surface of the bearing body 2 and the lubricant oil agent G spread on the ring-shaped upper surface 5. Therefore, the thrust slide bearing 1 can be made up by three parts, namely, the bearing body 2, the ring-shaped metal plate 4, and the ring-shaped cover 3. As a result, the height of the thrust slide bearing 1 itself can be lowered, and the installation space of the thrust slide bearing 1 can be reduced, and the number of the component parts can be reduced, realizing reduction in weight and cost of the thrust slide bearing 1 as a whole. Further, since the ring-shaped metal plate 4 supports one end of the piston rod 63, it is possible to omit an installation member for supporting the one end of the piston rod 63 in the installation mechanism 66 for installing the strut-type suspension 65 in the vehicle body. Accordingly, the installation mechanism 66 can be simplified, to realize cost reduction.

Further, according to the thrust slide bearing 1 of the present embodiment, the ring-shaped metal plate 4 is integrally formed with the outer disk portion 43 via the inclined connecting portion 45, and has the inner disk portion 44 that is positioned in the through-hole 25 defined by the inner periphery surface 26 of the disk portion 28 of the ring-shaped cover 3. This inner disk portion 44 serves the same work to a reinforcing portion (rib) for the outer disk portion 43, and as a result, deformation of the ring-shaped metal plate 4 can be prevented even if large force is applied to the ring-shaped metal plate 4 via the piston rod 63. Thus, generation of abnormal noise due to deformation of the ring-shaped metal plate 4 can be suppressed as far as possible, in relative rotation of the piston rod 63.

In the thrust slide bearing 1 of the present embodiment, it is favorable that at least one of the upper surface 53 and the lower surface 54 of the inner disk portion of the ring-shaped metal plate 4 held between the ring-shaped step surface 76 formed between the large-diameter portion 73 and the small-diameter portion 74 of the piston rod 63 is coated with malleable soft metal such as zinc, copper, tin, or the like. By such coating, at least one set of surface, namely, either a set of the ring-shaped step surface 76 and the lower surface 54 of the inner disk portion 44 or a set of the seating surface 78 of the nut 77 and the upper surface 53 of the inner disk portion 44 comes in almost whole surface contact with each other, and local contact can be avoided. Accordingly, stress from the piston rod 63 under load in the axial direction can be distributed. As a result, it is possible to prevent generation of damage such as cracking in the inner disk portion 44.

Further, in the thrust slide bearing 1 of the present embodiment, electrodeposition coating may be applied to the ring-shaped lower surface 47 of the outer disk portion 43 of the ring-shaped metal plate 4. Favorably, such electrodeposition coating is performed as cationic electrodeposition coating of plastic paint such as epoxy resin, amino-alkyd resin, acrylic resin, or the like.

The inner ring-shaped shallow groove 61 and the outer ring-shaped shallow groove 62 are formed in the ring-shaped upper surface 5 of the bearing body 2 functioning as the sliding surface, and the electrodeposition coating is applied to the ring-shaped lower surface 47, which faces the ring-shaped upper surface 5 of the bearing body 2, of the outer disk portion 43 of the ring-shaped metal plate 4. Thus, it is possible to reduce the contact area between the ring-shaped upper surface 5 of the bearing body 2 and the ring-shaped lower surface 47 of the outer disk portion 43 of the counterpart member, namely, the ring-shaped metal plate 4 at relative rotation of the ring-shaped metal plate 4 and the bearing body 2 in the circumferential direction R about the axis O, and to raise the contact pressure (load per unit of area) applied on the ring-shaped upper surface 5 of the bearing body 2. This can realize further reduction of friction, in addition to the reduction of friction owing to the friction reduction between resins, namely, the electrodeposition coatings applied on the ring-shaped upper surface 5 of the bearing body 2 of synthetic resin and on the ring-shaped lower surface 47 of the outer disk portion 43 of the ring-shaped metal plate 4 and reduction of friction owing to spreading of the lubricant oil agent G, with which the inner ring-shaped shallow groove 61 and the outer ring-shaped shallow groove 62 are filled, over the ring-shaped upper surface 5.

Further, in the thrust slide bearing 1 of the above embodiment, the inner ring-shaped shallow groove 61 and the outer ring-shaped shallow groove 62 are formed in the ring-shaped upper surface 5 functioning as the sliding surface of the bearing body 2. The inner ring-shaped shallow groove 61 and the outer ring-shaped shallow groove 62 have the same depth shallower than that of the ring-shaped deep groove 60 and are arranged in two lines of the inner line and the outer line along the circumferential direction R to surround doubly the ring-shaped deep groove 60. The inner ring-shaped shallow groove 61, the outer ring-shaped shallow groove 62, and the ring-shaped deep groove 60 are filled with the lubricant oil agent G such as grease. However, the present invention is not limited to this. It is sufficient that at least two recessed portions having the depth shallower than that of the ring-shaped deep groove 60 are formed in lines along the circumferential direction R in the ring-shaped upper surface 5 of the bearing body 2, so as to surround the ring-shaped deep groove 60, and these recessed portions and the ring-shaped deep groove 60 are filled with the lubricant oil agent R. For example, three or more shallow grooves may be formed to surround the ring-shaped deep groove 60 in the ring-shaped upper surface 5 functioning as the sliding surface of the bearing body 2. Or, the pattern of the recessed portions surrounding the ring-shaped deep groove 60 does not need to be a continuous ring shape along the circumferential direction of the ring-shaped upper surface 5. As shown in the following, these recessed portions can be discontinuous recessed portion arranged along the circumferential direction of the ring-shaped upper surface 5.

Figure 6:
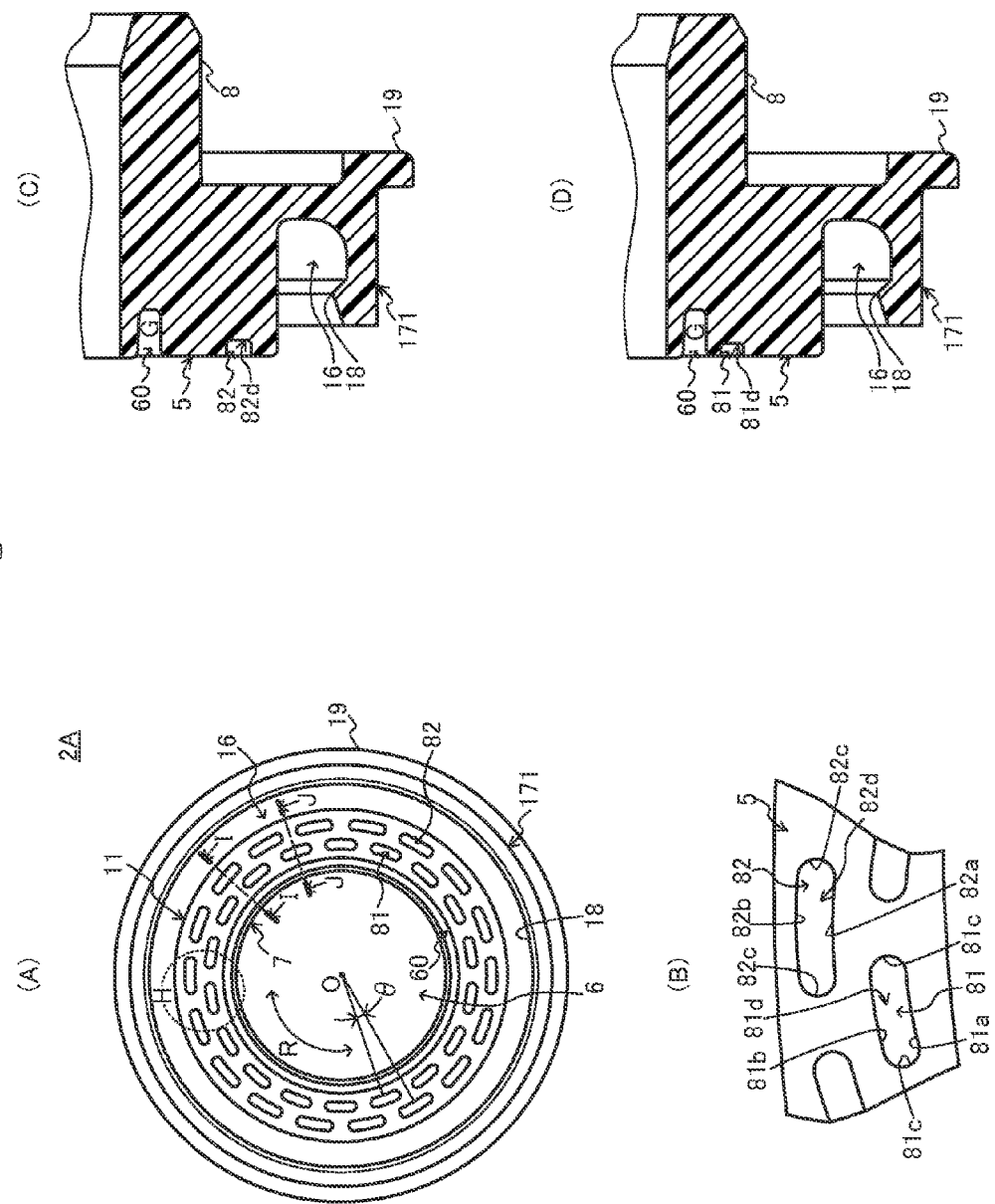
FIG. 6(A) is a top view of a bearing body 2A as a variant of the bearing body 2.
FIG. 6(B) is an enlarged view of the part H of the bearing body 2A shown in FIG. 6(A), and FIGS. 6(C) and 6(D) are an I-I cross-section view and an J-J cross-section view of the bearing body 2A shown in FIG. 6(A).

FIG. 6(A) is a top view of a bearing body 2A as a variant of the bearing body 2, FIG. 6(B) is an enlarged view of the part H of the bearing body 2A shown in FIG. 6(A), and FIGS. 6(C) and 6(D) are an I-I cross-section view and an J-J cross-section view of the bearing body 2A shown in FIG. 6(A). In FIG. 6, components having the same functions as in the bearing body 2 shown in FIG. 2 are attached with the same signs.

As shown in FIG. 6, the bearing body 2A is different from the bearing body 2 shown in FIG. 2 in that a plurality of inner recessed portions 81 and a plurality of outer recessed portions 82 having the same depth shallower than that of the ring-shaped deep groove 60 are formed instead of the inner ring-shaped shallow groove 61 and the outer ring-shaped shallow groove 62. In detail, the plurality of inner recessed portions 81 and the plurality of outer recessed portions 82 are formed, so as to be arranged in two lines, namely, an inner line and an outer line, along the circumferential direction R to surround doubly the ring-shaped deep groove 60. These inner recessed portions 81 and outer recessed portions 82 are filled with a lubricant oil agent G such as grease similarly to the inner ring-shaped shallow groove 61 and the outer ring-shaped shallow groove 62.

Here, the inner recessed portions 81 and the outer recessed portions 82 are arranged so as to have phase difference of a prescribed angle θ1 (θ1=6° in the present example) in the circumferential direction R from each other.

Each of the plurality of inner recessed portions 81 positioned in the inner line comprises: an inner arc-like wall surface 81a which extends in an arc shape in the circumferential direction R whose center is the axis O; an outer arc-like wall surface 81b which is positioned on the outer side in the radial direction relative to the inner arc-like wall surface 81a and extends in an arc shape in the circumferential direction R whose center is the axis O; a pair of semicircular wall surfaces 81c which are each connected to the inner arc-like wall surface 81a and the outer arc-like wall surface 81b and are opposde each other in the circumferential direction R; and a bottom surface 81d which is connected to the inner arc-like wall surface 81a, the outer arc-like wall surface 81b, and the pair of semicircular wall surfaces 81c.

Each of the plurality of outer recessed portions 82 positioned in the outer line comprises: an inner arc-like wall surface 82a which extends in an arc shape in the circumferential direction R whose center is the axis O; an outer arc-like wall surface 82b which is positioned on the outer side relative to the inner arc-like wall surface 82a and extends in an arc shape in the circumferential direction R whose center is the axis O; a pair of semicircular wall surfaces 82c which are each connected to the inner arc-like wall surface 82a and the outer arc-like wall surface 82b and are opposed each other in the circumferential direction R; and a bottom surface 82d which is connected to the inner arc-like wall surface 82a, the outer arc-like wall surface 82b, and the pair of semicircular wall surfaces 82c.

Here, the area ratio of the opening spaces of the plurality of inner recessed portions 81 and the plurality of outer recessed portions 82 to the ring-shaped upper surface 5 of the bearing body 2A is 20-50%, and favorably 30-40%. The plurality of inner recessed portions 81 and the plurality of outer recessed portions 82 are formed in the ring-shaped upper surface 5 of the bearing body 2A and arranged in two lines, namely, the inner line and the outer line. In detail, to show satisfactorily the low friction property of the lubricant oil agent G such as grease in the plurality of inner recessed portions 81 and the plurality of outer recessed portions 82 which are filled with and hold the lubricant oil agent G, it is favorable that the ratio of the area of the plurality of inner recessed portions 81 and the plurality of outer recessed portions 82 to the area of the ring-shaped upper surface 5 of the bearing body 2A is at least 20%. However, when the ratio exceeds 50%, it incurs deterioration of strength of the thrust slide bearing surface, and plastic deformation such as creep is likely to occur. In the example shown in FIG. 6(A), the recessed portions are formed so that the ratio becomes about 30%.

In the thrust slide bearing 1 using the bearing body 2A of the above configuration, the plurality of inner recessed portions 81 and the plurality of outer recessed portions 82 are formed in the ring-shaped upper surface 5 functioning as the sliding surface of the bearing body 2A. Accordingly the contact area between the ring-shaped upper surface 5 of the bearing body 2A and the counterpart member (the ring-shaped lower surface 47 of the outer disk portion 43 of the ring-shaped metal plate 4) can be reduced. Thus, the contact pressure (load per unit of area) applied on the ring-shaped upper surface 5 of the bearing body 2 is raised. This can realize further reduction of friction, in addition to the reduction of friction owing to the interposition of the lubricant oil agent G with which the inner recessed portions 81 and the outer recessed portions 82 are filled, between the ring-shaped upper surface 5 of the bearing body 2A and the ring-shaped lower surface 47 of the outer disk portion 43 of the ring-shaped metal plate 4. Further, in the case where cationic electrodeposition coating is formed on the ring-shaped lower surface 47 of the outer disk portion 43 of the ring-shaped metal plate 4 as the counterpart member, further reduction of friction can be realized by adding reduction of friction owing to friction reduction between resins, namely, between the ring-shaped upper surface 5 of the bearing body 2A made of synthetic resin and the cationic electrodeposition coating.

Also in the case where the bearing body 2A is used, the ring-shaped metal plate 4 has the inner disk portion 44 that is integrally formed with the outer disk portion 43 and is positioned in the through-hole 25 defined by the inner periphery 26 of the ring-shaped cover 3. Accordingly the inner disk portion 44 serves the same work to a reinforcing portion (rib) for the outer disk portion 43. As a result, deformation of the ring-shaped metal plate 4 can be prevented even if large force is applied to the ring-shaped metal plate 4 via the piston rod 63, and thus generation of abnormal noise due to deformation of the ring-shaped metal plate 4 in relative rotation of the piston rod 63 can be suppressed as far as possible.

Further, the ring-shaped upper surface 5 of the bearing body 2A which functions as the sliding surface, comprises: the ring-shaped deep groove 60 formed in the innermost side of the ring-shaped upper surface 5; and the plurality of inner recessed portions 81 and the plurality of outer recessed portions 82, which are formed to be arranged to surround doubly the ring-shaped deep groove 60 and have the same depth shallower than that of the ring-shaped deep groove. These portions and groove, namely, the plurality of inner recessed portions 81, the plurality of outer recessed portions 82, and the ring-shaped deep groove 60, are filled with the lubricant oil agent G. Thus, the height of the thrust slide bearing 1 itself can be reduced, the installation space of the thrust slide bearing 1 can be reduced, and the number of the components parts can be reduced, to realize weight reduction and cost reduction of the thrust slide bearing 1 as a whole.

Further, a first intrusion prevention means for preventing intrusion of foreign substances such as grit and dust from the outer periphery surface side of the thrust slide bearing 1 onto the ring-shaped upper surface 5 of the bearing body 2A is formed by the outer periphery surface 171 of the cylindrical protruding portion 17 of the bearing body 2A, the outer cylindrical drooping portion 39 of the ring-shaped cover 3 which surrounds the outer periphery surface 171, and the ring-shaped convex portion 19 which integrally protrudes outward in the radial direction from the outer circumferential edge of the ring-shaped protruding portion 12 of the bearing body 2A so as to close the ring-shaped gap formed in the radial direction between the outer periphery 171 and the outer cylindrical drooping portion 39. Further, a second intrusion prevention means for preventing intrusion of foreign substances such as grit and dust from the outer periphery surface side of the thrust slide bearing 1 onto the ring-shaped upper surface 5 of the bearing body 2A is formed by the upward-open recessed portion 16 of the ring-shaped protruding portion 12 of the bearing body 2A and the outer cylindrical drooping portion 39 which is inserted into the upward-open recessed portion so that the engaging protruding portion 31 of the ring-shaped cover 3 is elastically fitted to the engaging protruding portion 18 of the bearing body 2A. Therefore, intrusion of foreign substances such as grit and dust onto the ring-shaped upper surface 5 functioning as the sliding surface of the bearing body 2A as far as possible, and rotation of the ring-shaped metal plate 4 about the axis O relative to the bearing body 2A can be performed smoothly.

INDUSTRIAL APPLICABILITY

The thrust slide bearing of the present invention can be widely applied to slide bearings for various mechanisms including a strut-type suspension.

REFERENCE SIGNS LIST

1: thrust slide bearing; 2, 2A: bearing body; 3: ring-shaped cover; 4: ring-shaped metal plate; 5: ring-shaped upper surface; 6: through-hole; 7: inner periphery surface; 8: cylindrical portion; 9: outer periphery surface; 10: ring-shaped flange portion; 12: ring-shaped protruding portion; 13: upper surface; 15: upper surface; 16: upward-open recessed portion; 17: cylindrical protruding portion; 18: engaging protruding portion; 19: ring-shaped convex portion; 25: through-hole; 26: inner periphery surface; 27: lower surface; 28: disk portion; 31: engaging protruding portion; 32: inner cylindrical drooping portion; 33: ring-shaped convex portion; 34: lower surface; 36: downward-open recessed portion; 39: outer cylindrical drooping portion; 43: outer disk portion; 44: inner disk portion; 46: upper surface; 47: ring-shaped lower surface; 60: ring-shaped deep groove; 61: inner ring-shaped shallow groove; 62: outer ring-shaped shallow groove; and G: lubricant oil agent.

The invention claimed is:

1. A thrust slide bearing, comprising:
a bearing body which is formed by resin, and has a ring-shaped first surface functioning as a sliding surface;
a ring-shaped metal plate which is supported on the ring-shaped first surface rotatably relative to the bearing body; and
a ring-shaped cover which is placed to cover the ring-shaped first surface and the ring-shaped metal plate, wherein,
the bearing body comprises:
a cylindrical portion which has a cylindrical inner periphery surface defining a through-hole;
a ring-shaped flange portion which integrally extends outward relative to a central axis of the through-hole in a radial direction from a cylindrical outer periphery surface of the cylindrical portion, to form the ring-shaped first surface;
a ring-shaped protruding portion which integrally protrudes outward relative to the central axis of the through-hole in the radial direction from an end side of a cylindrical outer periphery surface of the ring-shaped flange portion, said end side spaced away from the ring-shaped cover;
a cylindrical protruding portion which is integrally formed in a cylindrical shape with a first surface of the ring-shaped protruding portion, and has a cylindrical inner periphery surface, wherein a ring-shaped recessed portion defines an opening that is opened toward a direction of the ring-shaped cover is formed between the cylindrical inner periphery surface of the cylindrical protruding portion, the cylindrical outer periphery surface of the ring-shaped flange portion and the first surface of the ring-shaped protruding portion;
a ring-shaped engaging protruding portion which integrally protrudes inward relative to the central axis of the through-hole in the radial direction from an end side of the cylindrical inner periphery surface of the cylindrical protruding portion, said ring-shaped engaging protruding portion spaced between the opening of and a floor of the ring-shaped recessed portion; and
a ring-shaped convex portion which integrally protrudes outward in the radial direction relative to the central axis of the through-hole from an outer circumferential edge of the ring-shaped protruding portion,
the ring-shaped cover comprises:
a ring-shaped disk portion which has an inner periphery surface defining a through-hole concentric with the through-hole of the bearing body and a first surface connected to an edge of the inner periphery surface;
an inner cylindrical drooping portion which is integrally formed in a cylindrical shape with an outer periphery surface of the disk portion portion, said inner cylindrical drooping portion extending in a direction toward the first surface of the ring-shaped protruding portion of the bearing body;
a ring-shaped engaging protruding portion which protrudes outward in a radial direction from an end side of a cylindrical outer periphery surface of the inner cylindrical drooping portion, and engages with the engaging protruding portion of the bearing body;
a ring-shaped convex portion which protrudes outward in the radial direction from an end side of the cylindrical outer periphery surface of the inner cylindrical drooping portion, said end side being toward a direction of the ring-shaped disk portion; and an outer cylindrical drooping portion which is integrally formed in a cylindrical shape with a first surface of the ring-shaped convex portion toward the ring-shaped convex portion of the bearing body, and extends below an end of the inner cylindrical drooping portion in a direction that is away from said ring-shaped disk portion, wherein, a ring-shaped recessed portion that is opened in a direction away from said ring-shaped disk portion is formed between the outer cylindrical drooping portion, the cylindrical outer periphery surface of the inner cylindrical drooping portion and the first surface of the ring-shaped convex portion, the ring-shaped metal plate comprises:

a ring-shaped outer disk portion which comes in contact with the first surface of the disk portion of the ring-shaped cover; and an inner disk portion which is integrally formed with the outer disk portion on an inner side of the outer disk portion in a radial direction, and is positioned in the through-hole defined by the inner periphery surface of the disk portion of the ring-shaped cover, the inner disk portion of the ring-shaped metal plate comprises: a cylindrical inner surface which defines a through-hole concentric with the through-hole of the bearing body, and has a smaller diameter than a diameter of the inner periphery surface of the cylindrical portion of the bearing body, the ring-shaped first surface of the bearing body comprises:

a ring-shaped groove which is formed in an inner circumferential side of the ring-shaped first surface; and at least two recessed portions which are arranged along a circumferential direction to surround the ring-shaped groove, and have a depth shallower than a depth of the ring-shaped groove, and the ring-shaped groove and the at least two recessed portions are filled with a lubricant oil agent.

2. A thrust slide bearing according to claim 1, wherein, the at least two recessed portions are a plurality of inner recessed portions and a plurality of outer recessed portions, wherein the plurality of inner recessed portions and the plurality of outer recessed portions are arranged concentrically on the ring-shaped first surface, and the plurality of inner recessed portions and the plurality of outer recessed portions are arranged to have phase difference in the circumferential direction from each other.

3. A thrust slide bearing according to claim 2, wherein, each of the plurality of inner recessed portions comprises:

an inner arc-shape wall surface which extends in an arc shape whose center is an axis of the thrust slide bearing;

an outer arc-shape wall surface which is positioned on an outer side in the radial direction relative to the inner arc-shape wall surface, and extends in an arc shape whose center is the axis of the thrust slide bearing;

a pair of semicircular wall surfaces which are each connected to the inner arc-shape wall surface and the outer arc-shape wall surface, and are opposed each other in the circumferential direction; and a bottom surface which is connected to the inner arc-shape wall surface, the outer arc-shape wall surface, and the pair of semicircular wall surfaces.

4. A thrust slide bearing according to claim 3, wherein, each of the plurality of outer recessed portions is defined by:

an inner arc-shape wall surface which extends in an arc shape whose center is the axis of the thrust slide bearing;

an outer arc-shape wall surface which is positioned on an outer side in the radial direction relative to the inner arc-shape wall surface, and extends in an arc shape whose center is the axis of the thrust slide bearing;

a pair of semicircular wall surfaces which are each connected to the inner arc-shape wall surface and the outer arc-shape wall surface, and are opposed each other in the circumferential direction; and a bottom surface which is connected to the inner arc-shape wall surface, the outer arc-shape wall surface, and the pair of semicircular wall surfaces.

5. A thrust slide bearing according to claim 3, wherein, an area ratio of openings of the at least two recessed portions to the ring-shaped first surface is 20-50%.

6. A thrust slide bearing according to claim 3, wherein, the ring-shaped metal plate has an inclined connecting portion which lies between the outer disk portion and the inner disk portion, extends obliquely upward from an inner side of the outer disk portion, and is connected to the inner disk portion.

7. A thrust slide bearing according to claim 3, wherein, the outer disk portion of the ring-shaped metal plate has a ring-shaped second surface that is opposed to the ring-shaped first surface of the bearing body, and an electrodeposition coating is applied to the ring-shaped second surface.

8. A thrust slide bearing according to claim 2, wherein, each of the plurality of outer recessed portions is defined by:

an inner arc-shape wall surface which extends in an arc shape whose center is an axis of the thrust slide bearing;

an outer arc-shape wall surface which is positioned on an outer side in the radial direction relative to the inner arc-shape wall surface, and extends in an arc shape whose center is the axis of the thrust slide bearing;

a pair of semicircular wall surfaces which are each connected to the inner arc-shape wall surface and the outer arc-shape wall surface, and are opposed each other in the circumferential direction; and a bottom surface which is connected to the inner arc-shape wall surface, the outer arc-shape wall surface, and the pair of semicircular wall surfaces.

9. A thrust slide bearing according to claim 2, wherein, an area ratio of openings of the at least two recessed portions to the ring-shaped first surface is 20-50%.

10. A thrust slide bearing according to claim 2, wherein, the ring-shaped metal plate has an inclined connecting portion which lies between the outer disk portion and the inner disk portion, extends obliquely upward from an inner side of the outer disk portion, and is connected to the inner disk portion.

11. A thrust slide bearing according to claim 2, wherein, the outer disk portion of the ring-shaped metal plate has a ring-shaped second surface that is opposed to the ring-shaped first surface of the bearing body, and an electrodeposition coating is applied to the ring-shaped second surface.

12. A thrust slide bearing according to claim 1, wherein, an area ratio of openings of the at least two recessed portions to the ring-shaped first surface is 20-50%.

13. A thrust slide bearing according to claim 1, wherein, the outer disk portion of the ring-shaped metal plate has a ring-shaped second surface that is opposed to the ring-shaped first surface of the bearing body, and an electrodeposition coating is applied to the ring-shaped second surface.

14. A thrust slide bearing according to claim 1, wherein, the ring-shaped metal plate has an inclined connecting portion which lies between the outer disk portion and the inner disk portion, extends obliquely upward from an inner side of the outer disk portion, and is connected to the inner disk portion.

15. A thrust slide bearing according to claim 1, wherein, the at least two recessed portions are an inner ring-shaped groove and an outer ring-shaped groove, wherein the inner ring-shaped groove and the outer ring-shaped groove are arranged concentrically on the ring-shaped first surface.

16. A thrust slide bearing according to claim 15, wherein, an area ratio of openings of the at least two recessed portions to the ring-shaped first surface is 20-50%.

17. A thrust slide bearing according to claim 15, wherein, the ring-shaped metal plate has an inclined connecting portion which lies between the outer disk portion and the inner disk portion, extends obliquely upward from an inner side of the outer disk portion, and is connected to the inner disk portion.

18. A thrust slide bearing according to claim 15, wherein, the outer disk portion of the ring-shaped metal plate has a ring-shaped second surface that is opposed to the ring-shaped first surface of the bearing body, and an electrodeposition coating is applied to the ring-shaped second surface.

19. A combination mechanism of a thrust slide bearing and a piston rod, comprising:
the thrust slide bearing according to claim 15; and
a piston rod of a shock absorber, wherein:
the piston rod comprises:
a first-diameter portion which is positioned in the through-hole defined by the inner periphery surface of the cylindrical portion of the bearing body;
a second-diameter portion which is integrally formed with the first-diameter portion, whose diameter is smaller than that of the first-diameter portion, and which is positioned in the through-hole defined by the cylindrical inner surface of the inner disk portion of the ring-shaped metal plate; and
a threaded portion which is threaded in the second-diameter portion, and
the ring-shaped metal plate of the thrust slide bearing is held between a ring-shaped step surface which is formed between the first-diameter portion and the second-diameter portion of the piston rod, and a seating surface of a nut screwed onto the threaded portion.

20. A combination mechanism of a thrust slide bearing and a piston rod, comprising:
the thrust slide bearing according to claim 1; and
a piston rod of a shock absorber, wherein:
the piston rod comprises:
a first-diameter portion which is positioned in the through-hole defined by the inner periphery surface of the cylindrical portion of the bearing body;
a second-diameter portion which is integrally formed with the first-diameter portion, whose diameter is smaller than that of the first-diameter portion, and which is positioned in the through-hole defined by the cylindrical inner surface of the inner disk portion of the ring-shaped metal plate; and
a threaded portion which is threaded in the second-diameter portion, and
the ring-shaped metal plate of the thrust slide bearing is held between a ring-shaped step surface which is formed between the first-diameter portion and the second-diameter portion of the piston rod, and a seating surface of a nut screwed onto the threaded portion.

* * * * *